US012205271B2

(12) United States Patent
Oscarsson

(10) Patent No.: US 12,205,271 B2
(45) Date of Patent: Jan. 21, 2025

(54) SYSTEM AND METHOD FOR MEASURING KEY FEATURES OF A ROTARY MILKING PARLOR ARRANGEMENT, COMPUTER PROGRAM AND NON-VOLATILE DATA CARRIER

(71) Applicant: DELAVAL HOLDING AB, Tumba (SE)

(72) Inventor: Erik Oscarsson, Tumba (SE)

(73) Assignee: DeLaval Holding AB, Tumba (SE)

( * ) Notice: Subject to any disclaimer, the term of this patent is extended or adjusted under 35 U.S.C. 154(b) by 515 days.

(21) Appl. No.: 17/610,922

(22) PCT Filed: May 6, 2020

(86) PCT No.: PCT/SE2020/050461
§ 371 (c)(1),
(2) Date: Nov. 12, 2021

(87) PCT Pub. No.: WO2020/231314
PCT Pub. Date: Nov. 19, 2020

(65) Prior Publication Data
US 2022/0222802 A1   Jul. 14, 2022

(30) Foreign Application Priority Data
May 14, 2019   (SE) .................................. 1950572-6

(51) Int. Cl.
*G06T 7/00* (2017.01)
*A01J 5/007* (2006.01)
(Continued)

(52) U.S. Cl.
CPC .............. *G06T 7/001* (2013.01); *A01J 5/007* (2013.01); *A01J 5/017* (2013.01); *A01K 1/126* (2013.01);
(Continued)

(58) Field of Classification Search
CPC .. G06T 7/001; G06T 7/38; G06T 7/74; G06T 2207/30164; A01J 5/007; A01J 5/017;
(Continued)

(56) References Cited

U.S. PATENT DOCUMENTS 5,967,091 A * 10/1999 Zartman .............. A01K 1/0011
119/516
8,794,181 B2 * 8/2014 Bareket ................... A01J 5/007
119/14.08
(Continued)

FOREIGN PATENT DOCUMENTS

GB           2471707 A *   1/2011    ........... A01K 1/0011
WO    2012/149075       11/2012
(Continued)

OTHER PUBLICATIONS

English translation of GB-2471707-A, A Livestock Accommodation Divider. (Year: 2011).*
(Continued)

*Primary Examiner* — Manav Seth
(74) *Attorney, Agent, or Firm* — NIXON & VANDERHYE

(57) ABSTRACT

A rotating platform having a plurality of stalls is provided, each of the stalls being configured to house a respective animal during milking. The stalls are separated from one another by delimiting structures. A camera registers three-dimensional image data of the rotating platform within a field of view. A controller receives the image data that has been registered while the rotating platform completes at least one full revolution around its rotation axis. The controller processes the image data to derive a set of key features of the rotating platform, and then stores the set of
(Continued)

key features in a data storage, which is configured to make the set of key features available for use at a later point in time.

24 Claims, 2 Drawing Sheets

(51) Int. Cl.
*A01J 5/017* (2006.01)
*A01K 1/12* (2006.01)
*B25J 9/16* (2006.01)
*G06T 7/38* (2017.01)
*G06T 7/73* (2017.01)
*G06V 10/62* (2022.01)
*G06V 10/70* (2022.01)

(52) U.S. Cl.
CPC ............... *B25J 9/1697* (2013.01); *G06T 7/38* (2017.01); *G06T 7/74* (2017.01); *G06V 10/62* (2022.01); *G06V 10/768* (2022.01); *G06T 2207/30164* (2013.01)

(58) Field of Classification Search
CPC .......... A01K 1/126; A01K 1/12; A01K 1/123; B25J 9/1697; G06V 10/62; G06V 10/768
See application file for complete search history.

(56) References Cited

U.S. PATENT DOCUMENTS

| | | | |
|---|---|---|---|
| 9,770,007 B2* | 9/2017 | Holmstrom | A01J 5/0175 |
| 10,104,863 B1 | 10/2018 | Henry et al. | |
| 2010/0288198 A1* | 11/2010 | Liao | G06V 40/23 |
| | | | 119/14.08 |
| 2010/0307420 A1* | 12/2010 | Axelsson | A01J 5/0175 |
| | | | 119/14.08 |
| 2012/0132142 A1* | 5/2012 | Holmgren | A01K 1/0029 |
| | | | 119/14.08 |
| 2012/0204797 A1* | 8/2012 | Courtemanche | A01K 1/126 |
| | | | 119/14.02 |
| 2015/0366156 A1* | 12/2015 | Holmström | A01J 7/04 |
| | | | 119/650 |
| 2018/0049396 A1 | 2/2018 | Foresman et al. | |
| 2022/0222802 A1* | 7/2022 | Oscarsson | G06T 7/74 |

FOREIGN PATENT DOCUMENTS

| | | |
|---|---|---|
| WO | 2018/008026 | 1/2018 |
| WO | 2020/091668 | 5/2020 |

OTHER PUBLICATIONS

International Search Report for PCT/SE2020/050461, mailed Jul. 24, 2020, 5 pages.
Written Opinion of the ISA for PCT/SE2020/050461, mailed Jul. 24, 2020, 7 pages.
Search Report for SE1950572-6, mailed Feb. 12, 2019, 2 pages.

* cited by examiner

SYSTEM AND METHOD FOR MEASURING KEY FEATURES OF A ROTARY MILKING PARLOR ARRANGEMENT, COMPUTER PROGRAM AND NON-VOLATILE DATA CARRIER

This application is the U.S. national phase of International Application No. PCT/SE2020/050461 filed 6 May 2020, which designated the U.S. and claims priority to SE Patent Application No. 1950572-6 filed 14 May 2019, the entire contents of each of which are hereby incorporated by reference.

TECHNICAL FIELD

The present invention relates generally to solutions for milking animals while being located on a rotating platform. Especially, the invention relates to a system for measuring a set of key features of a rotary milking parlor arrangement and a method implemented in such a system. The invention also relates to a corresponding computer program and a non-volatile data carrier storing such a computer program.

BACKGROUND

Today's automatic milking arrangements are highly complex installations. This is particularly true for rotary milking platforms, where a relatively large number of milking stations are served by at least one milking robot, or similar automatic equipment. Inter alia, this means that the milking robot attaches teatcups and other tools, e.g. cleaning cups, to the animals in a fully automatic manner. For successful operation, among other things, the milking robot must have adequate information about the physical characteristics of the rotary milking parlor arrangement. Typically, each arrangement is a customized installation, i.e. individually designed. Therefore, it is not possible to enter factory default data about the arrangement upfront for use by the control system for the milking robot. Instead, for each setup, the milking robot must be taught about (i.e. programmed with information describing) the specific configuration of the arrangement that the milking robot shall serve. This, in turn, is a very time-consuming process. Moreover, if the information is entered manually, there is an imminent risk that data errors are introduced.

SUMMARY

The objective of the present invention is therefore to offer an improved solution for programming the control system for a milking robot with information describing the key features of a rotary milking parlor arrangement.

According to one aspect of the invention, the objective is achieved by a system for measuring a set of key features of a rotary milking parlor arrangement. The arrangement, in turn, contains a rotating platform with a plurality of stalls, each of which is configured to house a respective animal during milking. The stalls are separated from one another by delimiting structures. The proposed system includes a camera and a control unit. The camera is configured to register three-dimensional image data of the rotating platform within a field of view, and the control unit is configured to process the registered image data. Specifically, the control unit is configured to receive the image data that has been registered while the rotating platform completes at least one full revolution around its rotation axis, process the image data to derive the set of key features, and store the set of key features in a data storage which is configured to make the set of key features available for use at a later point in time, e.g. via a cloud service. Inter alia, this enables the set of key features to be used in a so-called digital twin of the rotary milking parlor arrangement.

This system is advantageous because it provides reliable information about the physical characteristics of a rotary milking parlor arrangement in a fully automatic manner.

Preferably, the image data are registered while the rotating platform is empty of animals. Namely, this enables a higher data quality than if for example animals are located in one or more of the stalls. Moreover, if image data have been registered when the rotating platform is empty of animals, this data can then be compared with a data set registered when there are animals on the rotating platform, for instance via a subtractive operation, in order to conclude which visual objects that form part of the rotating platform, as such, and which visual objects that represent other entities, e.g. animals. This, in turn, may for example be advantageous when estimating a velocity of the rotating platform and/or controlling a robotic arm to perform actions in relation to animals located on the rotating platform.

According to one embodiment of this aspect of the invention, the control unit is further configured to process the image data to identify at least one recurring pattern therein, which recurring pattern represents a visual characteristic that is identical for all of said stalls on the rotating platform. Knowledge of such a recurring pattern facilitates navigation on the rotating platform and thus highly improves the chances of controlling a robotic arm successfully, for example after having found an entry window to reach an animal's teats.

Further preferably, the control unit is configured to make use of the information gathered in an automatic manner. For example, the control unit may be configured to retrieve the set of key features from the data storage; and based on the retrieved set of key features, run a search procedure investigating whether or not an entry window is available for controlling a robotic arm to perform an action relating to a milk-producing animal located in one of said stalls. Thereby, the efficiency of performing automatic milking as well as pre and post milking treatment of the animals' teats can be increased significantly.

According to another embodiment of this aspect of the invention, the set of key features contains one or more of a respective width measure of each of the stalls, a respective height measure of the delimiting structures separating said stalls from one another, and a respective depth measure of each of the stalls. Thus, the set of key features provides highly relevant boundary conditions for controlling one or more robotic arms to perform actions relating to milk-producing animals on the rotating platform.

According to another embodiment of this aspect of the invention, the set of key features contains data describing the physical characteristics of at least one piece of fixed equipment that is arranged in at least one of said stalls. Hence, the at least one piece of fixed equipment may serve as a reference object for controlling a robotic arm. Preferably, at least one of the at least one piece of fixed equipment is arranged at a particular position in each stall on the rotating platform, and the particular position is the same for all stalls. Namely, thereby, key features describing the piece of fixed equipment in one stall can be reused to control the robotic arm in another stall.

According to other embodiments of this aspect of the invention, the control unit is configured to determine a current rotation angle of the rotating platform and/or a rotation speed of the rotating platform. The current rotation angle of the rotating platform is determined based on currently registered image data, and stored data retrieved from the data storage, e.g. by comparing key features derived from historic image data with current image data. The rotation speed of the rotating platform is determined based on image data registered at at least two points in time, and stored data retrieved from the data storage. Consequently, the stored data may be used also for controlling the rotating platform.

According to yet another embodiment of this aspect of the invention, the set of key features contains a position of a structure, which is arranged on a stationary part of the rotary milking parlor arrangement, which structure is configured to prevent the hind legs of an animal in one of said stalls from reaching outside of a safety zone for said one of said stalls. In other words, the set of key features may include data describing a location of a so-called kick rail. Since this structure is stationary, it will constitute a reliable reference for the other features in the set of key features.

According to another aspect of the invention, the object is achieved by a method of measuring a set of key features of a rotary milking parlor arrangement. The rotary milking parlor arrangement contains a rotating platform with a plurality of stalls, each of which is configured to house a respective animal during milking. The stalls are separated from one another by delimiting structures. The method includes the following steps. Via a camera, three-dimensional image data of the rotating platform are registered within a field of view. More precisely, the image data are registered while the rotating platform completes at least one full revolution around its rotation axis. The image data are processed to derive the set of key features. The set of key features are stored in a data storage, which is configured to make the set of key features available for use at a later point in time. The advantages of this method, as well as the preferred embodiments thereof, are apparent from the discussion above with reference to the system.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
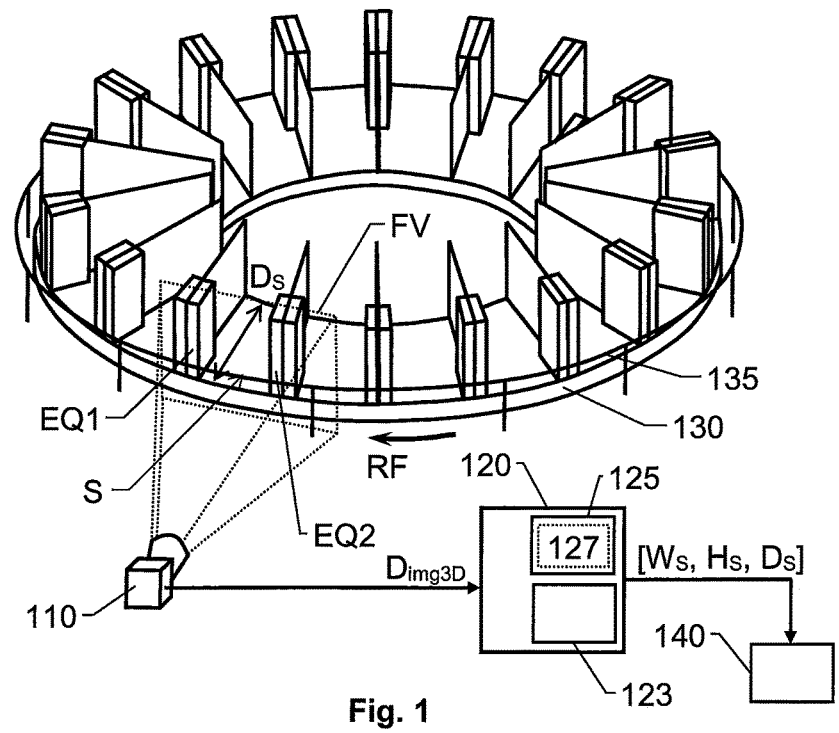
FIG. 1 shows a system for measuring a set of key features of a rotary milking parlor arrangement according to one embodiment the invention.

In FIG. 1, we see a rotating platform 130, which forms part of a rotary milking parlor arrangement. In this example, the rotating platform 130 has 18 milking stalls S. Of course, however, any higher or lower number of stalls S is conceivable according to the invention.

Figure 2:
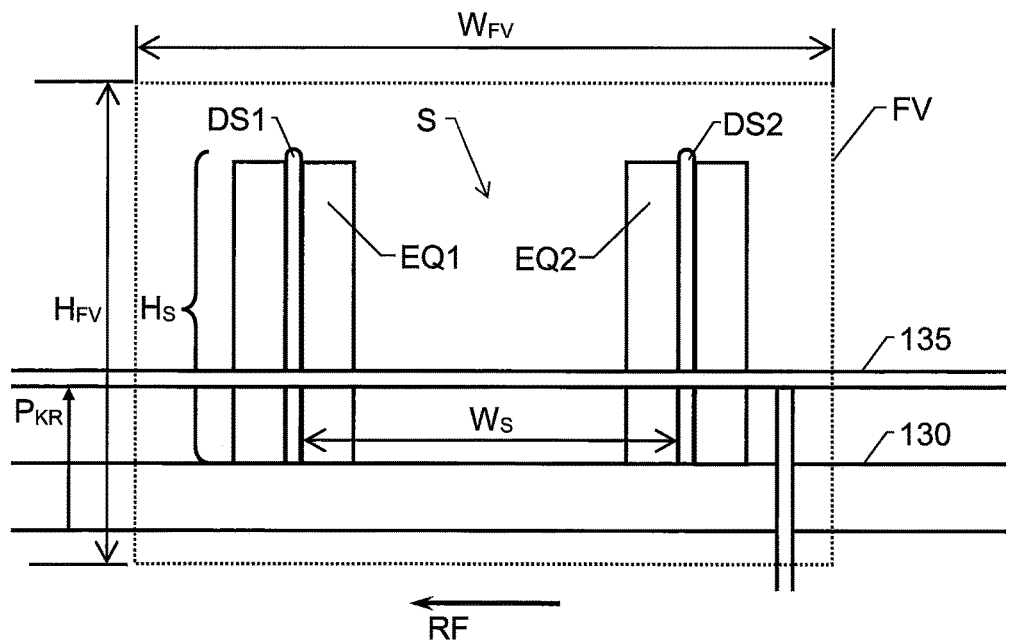
FIG. 2 illustrates a camera's field of view of the rotary milking parlor arrangement in FIG. 1.

According to the invention, a system for measuring a set of key features of the rotary milking parlor arrangement includes a camera 110 and a control unit 120. The camera 110 is configured to register three-dimensional image data $D_{img3D}$ of the rotating platform 130 within a field of view FV as illustrated in FIG. 2.

Preferably, the camera 110 is arranged in relation to the rotating platform 130 such that the field of view FV covers at least 1.5 of the milking stalls S. Namely, this provides a substantial overlap of the image data $D_{img3D}$ registered in respect of each milking stall S, and thus enables high reliability in this data.

The control unit 120 is configured to process the registered image data $D_{img3D}$. This may involve comparing, e.g. via a subtractive operation, first and second amounts of image data $D_{img3D}$ with one another, where the first amount of image data $D_{img3D}$ has been registered while the rotating platform 130 is empty of animals, and the second amount of image data $D_{img3D}$ has been registered while at least one animal is present on the rotating platform 130. Based on this comparison, the control unit 120 is preferably configured to determine at least one visual object in the first and second amounts of image data $D_{img3D}$ that represents an object forming part of the rotating platform 130.

Preferably, the camera 110 is a time-of-flight (ToF) camera, i.e. a range imaging camera system that resolves distance based on the known speed of light. According to the invention, however, the camera 110 may be any alternative imaging system capable of determining the respective distances to the objects being imaged, for example a 2D camera emitting structured light or a combined light detection and ranging (LIDAR) camera system. Moreover, the three-dimensional image data $D_{img3D}$ may be dynamic. This means that the three-dimensional image data $D_{img3D}$ can be represented by a video sequence and/or be built up from multiple still images.

The rotating platform 130 has a plurality of stalls S, where each stall S is configured to house a respective animal during milking. The stalls S are separated from one another by delimiting structures, for example in the form of rails DS1 and DS2 respectively.

Specifically, the control unit 120 is configured to receive the image data $D_{img3D}$ having been registered while the rotating platform 130 completes at least one full revolution around its rotation axis, for instance in a forward rotation direction RF. The control unit 120 is further configured to process the image data $D_{img3D}$ to derive the set of key features, and store the set of key features in a data storage 140. The data storage 140, in turn, is configured to make the set of key features available for use at a later point in time, e.g. by the control unit 120. Thus, the data storage 140 may contain a digital storage medium, such as a hard drive, a Solid State Drive (SSD)/Flash memory and/or a Random Access Memory (RAM).

The set of key features may contain a first parameter reflecting a respective width measure $W_S$ of each of the stalls S. Since the stalls S are shaped as truncated triangles, the width measure $W_S$ may either express a width at an outer edge of the rotating platform 130, a width at an inner edge thereof, or both.

Alternatively, or additionally, the set of key features may contain a second parameter reflecting a respective height measure $H_S$ of the delimiting structures, e.g. DS1 and DS2, that separate the stalls S from one another.

Alternatively, or additionally, the set of key features may contain a third parameter reflecting a respective depth measure $D_S$ of each of the stalls S. For example, the depth measure $D_S$ may be represented by a distance between the above-mentioned outer and inner edges of the rotating platform 130.

During operation of the rotary milking parlor arrangement, the control unit 120 is preferably configured to retrieve the set of key features $W_S$, $H_S$ and/or $D_S$ from the data storage 140. Based on the retrieved set of key features $W_S$, $H_S$ and/or $D_S$, the control unit 120 is further preferably configured to run a search procedure, which investigates whether or not an entry window is available for controlling a robotic arm to perform an action relating to a milk-producing animal that is located in one of the stalls S. Naturally, according to the invention, the set of key features $W_S$, $H_S$ and/or $D_S$ may equally well be retrieved by any unit or device other than the control unit 120, which unit or device is configured to control one or more robotic arms during operation of the rotary milking parlor arrangement.

According to one embodiment of the invention, the set of key features contains data describing the physical characteristics of at least one piece of fixed equipment that is arranged in at least one of the stalls S. For example, the at least one piece of fixed equipment may be represented by a cabinet or a rack for holding a milking cluster. FIG. 2 symbolically illustrates such pieces of fixed equipment by EQ1 and EQ2 respectively.

Of course, the at least one piece of fixed equipment EQ1 and/or EQ2 may also constitute a portion of the delimiting structures DS1 and/or DS2.

Ideally, at least one of the at least one piece of fixed equipment EQ1 and/or EQ2 is arranged at a particular position in each of the stalls S, which particular position is the same for all the stalls S on the rotating platform 130. Consequently, a subset of key features describing this piece of fixed equipment in one of the stalls S can be reused in all the other stalls S on the rotating platform 130. Such use of a repeating pattern highly improves the reliability of the registered information.

The control unit 120 may For example, be configured to associate at least one identified recurring pattern with a respective one of the at least one piece of fixed equipment EQ1 and/or EQ2 being arranged at a particular position in each of said stalls S, which particular position is the same for all of said stalls S on the rotating platform 130. This, in turn, facilitates determining which visual objects in the image data $D_{img3D}$ that form part of the rotating platform 130, as such, and which visual objects that represent other entities, e.g. animals. Consequently, it is rendered comparatively straightforward for the control unit 120 to estimate a velocity of the rotating platform 130 and/or to control a robotic arm to perform actions in relation to animals located on the rotating platform 130.

According to one embodiment of the invention, the control unit 120 is further configured to determine a current rotation angle of the rotating platform 130. This rotation angle is determined based on currently registered image data $D_{img3D}$, e.g. a fresh video image frame representing the rotating platform 130 within the field of view FV, and stored data that have been retrieved from the data storage 140, for instance in the form of a set of key features derived from a historic video image frame representing the rotating platform 130.

Further, according to another embodiment of the invention, the control unit 120 is configured to determine a rotation speed of the rotating platform 130. The rotation speed is derived based on image data $D_{img3D}$ registered at at least two points in time, and stored data retrieved from the data storage 140, e.g. key features describing the width measure $W_S$ of the stalls S, the height measure $H_S$ of the delimiting structures DS1 separating the stalls S from one another and/or the depth $D_S$ measure of the stalls S.

Thereby, the data in the data storage 140 may not only be used to control a robotic arm, however also to control the rotary platform 130 as such.

To enhance the data quality of the set of key features it is preferable to include a position $P_{KR}$ of a structure 135 therein, which structure 135 is arranged on a stationary part of the rotary milking parlor arrangement. The structure 135 may thus be a so-called kick rail, i.e. a structure configured to prevent the hind legs of an animal in one of said stalls S from reaching outside of a safety zone for said one of said stalls S. The position $P_{KR}$ may be a measure reflecting an elevation of the structure 135 relative to a part of the rotary milking parlor arrangement that has a known location, such as the rotating platform 130, It is generally advantageous if the control unit 120 and the camera 130 are configured to effect the above-described procedure in an automatic manner by executing a computer program 127. Therefore, the control unit 120 may include a memory unit 125, i.e. non-volatile data carrier, storing the computer program 127, which, in turn, contains software for making processing circuitry in the form of at least one processor 125 in the central control unit 120 execute the above-described actions when the computer program 127 is run on the at least one processor 125.

Figure 3:
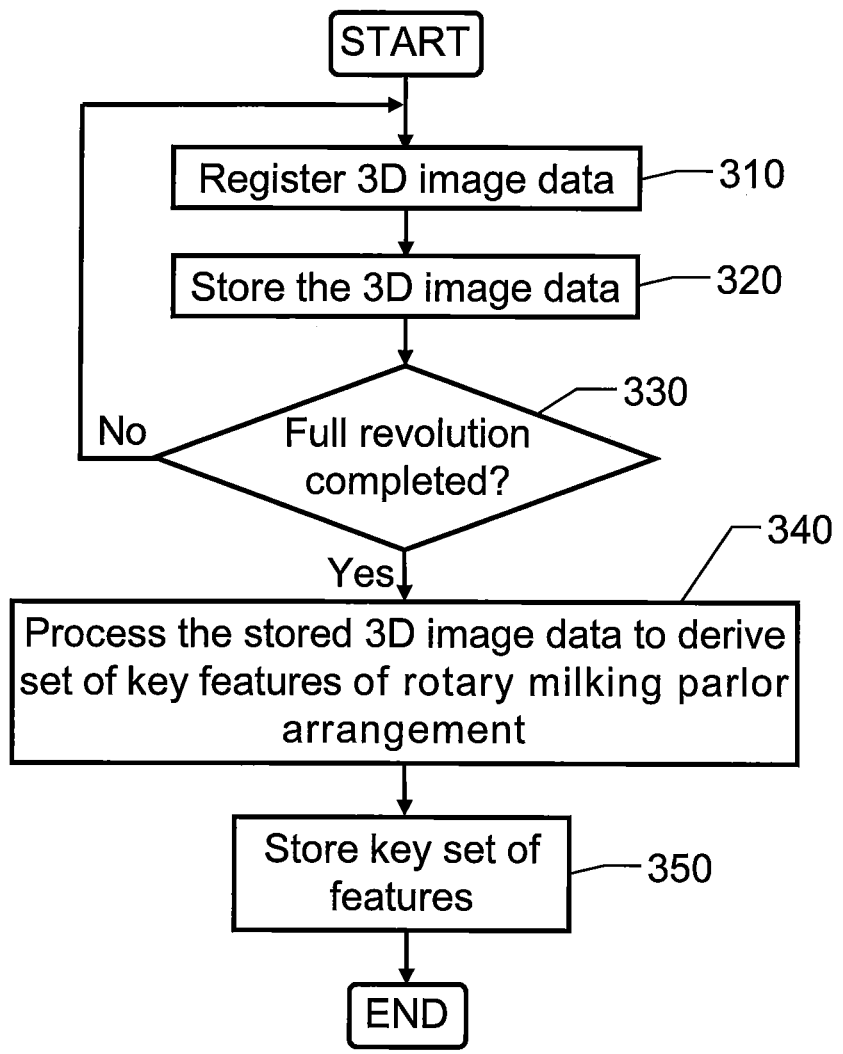
FIG. 3 illustrates, by means of a flow diagram, the general method according to the invention.

In order to sum up, and with reference to the flow diagram in FIG. 3, we will now describe the general method according to the invention of measuring a set of key features of a rotary milking parlor arrangement, which is presumed to contain a rotating platform with a plurality of stalls, each of which is configured to house a respective animal during milking, and where the stalls are separated from one another by delimiting structures.

In a first step 310, three-dimensional image data of the rotating platform are registered via a camera. The three-dimensional image data are registered within a field of view of the camera.

Then, in a step 320, the image data are stored; and in a subsequent step, 330, it is checked if a rotary platform of said arrangement has completed a full revolution. If so, a step 340 follows; and otherwise, the procedure loops back to step 310.

In step 340, the image data are processed to derive the set of key features.

Thereafter, in a step 350, the set of key features are stored in a data storage, which is configured to make the set of key features available for use at a later point in time. Subsequently, the procedure ends.

All of the process steps, as well as any sub-sequence of steps, described with reference to FIG. 3 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A system for measuring a set of key features of a rotary milking parlor arrangement, which includes a rotating platform with a plurality of stalls each of which is configured to house a respective animal during milking, said stalls being separated from one another by delimiting structures, the system comprising:
    a camera configured to register three-dimensional image data of the rotating platform within a field of view; and
    a controller configured to:
        receive the image data that has been registered while the rotating platform completes at least one full revolution around a rotation axis of the rotating platform,
        process the image data to derive the set of key features, and
        store the set of key features in a data storage which is configured to make the set of key features available for use at a later point in time,
    wherein the set of key features comprises a respective width measure of each of said stalls, and/or
    wherein the set of key features comprises a respective height measure of the delimiting structures separating said stalls from one another, and/or
    wherein the set of key features comprises a respective depth measure of each of said stalls.

2. The system according to claim 1, wherein the image data are registered while the rotating platform is empty of animals.

3. The system according to claim 1, wherein the controller is further configured to:
    compare first and second amounts of image data with one another, the first amount of image data having been registered while the rotating platform is empty of animals, the second amount of image data having been registered while at least one animal is present on the rotating platform, and
    based on said comparison, determine at least one visual object in the first and second amounts of image data that represents an object forming part of the rotating platform.

4. The system according to claim 1, wherein the controller is further configured to:
    process the image data to identify at least one recurring pattern therein, the at least one recurring pattern representing a visual characteristic that is identical for all of said stalls on the rotating platform.

5. The system according to claim 1, wherein the set of key features comprises data describing one or more physical characteristics of one or more of: (i) at least one of the stalls, (ii) at least one of the delimiting structures, (iii) at least one piece of fixed equipment disposed in at least one of said stalls, and (iv) a structure disposed on a stationary part of the rotary milking parlor.

6. The system according to claim 4, wherein the controller is further configured to:
    associate at least one of the at least one identified recurring pattern with a respective one of the at least one piece of fixed equipment arranged at a particular position in each of said stalls, the particular position being the same position for all of said stalls on the rotating platform.

7. The system according to claim 1, wherein the controller is further configured to:
    retrieve the set of key features from the data storage, and
    based on the retrieved set of key features, control a robotic arm to perform at least one action in relation to a milk-producing animal located on the rotating platform.

8. The system according to claim 1, wherein the controller is further configured to:
    retrieve the set of key features from the data storage, and
    based on the retrieved set of key features, run a search procedure investigating whether or not an entry window is available to control a robotic arm to perform an action relating to a milk-producing animal located in one of said stalls.

9. The system according to claim 5, wherein the at least one piece of fixed equipment constitutes a portion of the delimiting structures.

10. The system according to claim 1, wherein the controller is further configured to determine a current rotation angle of the rotating platform based on:
    currently-registered image data, and
    stored data retrieved from the data storage.

11. The system according to claim 10, wherein the controller is configured to determine a rotation speed of the rotating platform based on:
    image data registered at at least two points in time, and
    stored data retrieved from the data storage.

12. The system according to claim 5, wherein the set of key features comprises a position of the structure disposed on the stationary part of the rotary milking parlor, the structure being configured to prevent hind legs of an animal in one of said stalls from reaching outside of a safety zone for said one of said stalls.

13. A method of measuring a set of key features of a rotary milking parlor arrangement that includes a rotating platform with a plurality of stalls, each of the stalls being configured to house a respective animal during milking, said stalls being separated from one another by delimiting structures, the method comprising:
    registering, via a camera, three-dimensional image data of the rotating platform within a field of view;

registering the image data while the rotating platform completes at least one full revolution around a rotation axis of the rotating platform;

processing the registered image data to derive the set of key features; and storing the set of key features in a data storage which is configured to make the set of key features available for use at a later point in time, wherein the set of key features comprises a respective width measure of each of said stalls, and/or wherein the set of key features comprises a respective height measure of the delimiting structures separating said stalls from one another, and/or wherein the set of key features comprises a respective depth measure of each of said stalls.

14. The method according to claim 13, wherein the image data is registered while the rotating platform is empty of animals.

15. The method according to claim 13, further comprising:

comparing first and second amounts of image data with one another, the first amount of image data having been registered while the rotating platform is empty of animals, the second amount of image data having been registered while at least one animal is present on the rotating platform; and based on the comparing the first and second amounts of image data, determining at least one visual object in the first and second amounts of image data that represents an object forming part of the rotating platform.

16. The method according to claim 13, further comprising:

processing the registered image data to identify at least one recurring pattern therein, the recurring pattern representing a visual characteristic that is identical for all of said stalls on the rotating platform.

17. The method according to claim 13, wherein the set of key features comprises data describing one or more physical characteristics of one or more of: (i) at least one of the stalls, (ii) at least one of the delimiting structures, (iii) at least one piece of fixed equipment disposed in at least one of said stalls, and (iv) a structure disposed on a stationary part of the rotary milking parlor.

18. The method according to claim 16, further comprising:

associating at least one of the at least one identified recurring pattern with a respective one of the at least one piece of fixed equipment disposed at a particular position in each of said stalls, the particular position being the same for all of said stalls on the rotating platform.

19. The method according to claim 13, further comprising:

retrieving the set of key features from the data storage; and based on the retrieved set of key features, controlling a robotic arm to perform at least one action in relation to a milk-producing animal located on the rotating platform.

20. The method according to claim 13, wherein the at least one piece of fixed equipment constitutes a portion of the delimiting structures.

21. The method according to claim 13, further comprising determining a current rotation angle of the rotating platform based on:

currently-registered image data, and stored data retrieved from the data storage.

22. The method according to claim 21, further comprising determining a rotation speed of the rotating platform based on:

image data registered at at least two points in time, and stored data retrieved from the data storage.

23. The method according to claim 13, wherein the set of key features comprises a position of the structure disposed on the stationary part of the rotary milking parlor arrangement, the structure being configured to prevent hind legs of an animal in one of said stalls from reaching outside of a safety zone for said one of said stalls.

24. A non-transitory computer-readable medium having loaded thereon a computer program communicatively connected to a processor, the computer program comprising software configured to execute the method according to claim 13 when the computer program is run on the processor.

* * * * *